United States Patent
Wu

(10) Patent No.: US 9,592,561 B2
(45) Date of Patent: Mar. 14, 2017

(54) STROKE SAFETY DEVICE FOR A KEY DUPLICATING MACHINE

(71) Applicant: Kuo-Shen Wu, Taipei (TW)

(72) Inventor: Kuo-Shen Wu, Taipei (TW)

( * ) Notice: Subject to any disclaimer, the term of this patent is extended or adjusted under 35 U.S.C. 154(b) by 145 days.

(21) Appl. No.: 14/690,210

(22) Filed: Apr. 17, 2015

(65) Prior Publication Data
US 2016/0303662 A1     Oct. 20, 2016

(51) Int. Cl.
*B23C 3/35*     (2006.01)

(52) U.S. Cl.
CPC .......... *B23C 3/355* (2013.01); *B23C 3/35* (2013.01); *B23C 2235/48* (2013.01); *Y10T 409/300952* (2015.01); *Y10T 409/301064* (2015.01)

(58) Field of Classification Search
CPC . Y10T 409/300952; Y10T 409/301064; B23C 3/35; B23C 3/355; B23C 2235/48
See application file for complete search history.

(56) References Cited

U.S. PATENT DOCUMENTS

| | | | | |
|---|---|---|---|---|
| 548,298 A * | 10/1895 | Darling | ............... | B24B 17/02 33/516 |
| 1,089,127 A * | 3/1914 | Gussman | ............... | B23C 3/35 409/81 |
| 1,165,099 A * | 12/1915 | Hoernel | ............... | B23C 3/35 409/81 |
| 1,948,260 A * | 2/1934 | Fowler | ............... | B23C 3/35 33/539 |
| 2,329,269 A * | 9/1943 | Jacobi | ............... | B23C 3/35 409/81 |
| 3,902,382 A * | 9/1975 | Lieptz | ............... | B23C 3/355 29/76.2 |
| 4,051,748 A * | 10/1977 | Sherman | ............... | B23C 3/355 409/81 |
| 4,251,173 A * | 2/1981 | Saucedo | ............... | B23C 3/35 29/76.2 |
| 5,259,708 A * | 11/1993 | Brice | ............... | B23C 3/35 409/81 |
| 6,602,030 B1 * | 8/2003 | Markbreit | ............... | B23C 3/35 409/81 |
| 7,153,072 B2 * | 12/2006 | Wu | ............... | B23C 3/355 409/81 |
| 2002/0119739 A1 * | 8/2002 | Parillo | ............... | B23C 3/35 451/178 |
| 2005/0135891 A1 * | 6/2005 | Ryai | ............... | B23C 3/35 409/81 |
| 2012/0141221 A1 * | 6/2012 | Wu | ............... | B23C 3/35 409/81 |

* cited by examiner

*Primary Examiner* — Daniel Howell
*Assistant Examiner* — Yasir Diab
(74) *Attorney, Agent, or Firm* — John D. Russell

(57) ABSTRACT

A stroke safety device for a key duplicating machine has a fixed mount and a movable mount. The fixed mount is mounted around a connecting shaft of the key duplicating machine and has a first body, multiple first resilient members, multiple pressing elements, and an adjusting element. The first body has a through hole, an inclined segment, and a mounting recess. The movable mount is pivotally connected to the fixed mount and has a second body and an operating element. The second body is pivotally mounted on a base of the key duplicating machine to cover the inclined segment, and has two opposite side segments. The abutting rod is inserted into the mounting recess of the first body to selectively abut against the adjusting element.

12 Claims, 7 Drawing Sheets

STROKE SAFETY DEVICE FOR A KEY DUPLICATING MACHINE

BACKGROUND OF THE INVENTION

1. Field of the Invention

The present invention relates to a stroke safety device, and more particularly relates to a stroke safety device for a key duplicating machine that can provide a secure operating effect for the users operating the key duplicating machine to make a duplicate of a key.

2. Description of Related Art

A conventional key duplicating machine can be used to make key duplicates, and a user can put a key on the conventional key duplicating machine to make a duplicate of the key by abutting operating parts of the key duplicating machine tracing a contour of the key to cut a corresponding contour on the duplicate of the key.

With reference to FIG. 7, a conventional key duplicating machine is a copy shaper apparatus 60, and the copy shaper apparatus 60 has a base 61, a guiding element 62, a cutting element 63, a pivot shaft 64, a holder 65, and a supporting handle 66. The guiding element 62 is mounted on a top of the base 61 near a sidewall of the base 61. The cutting element 63 is rotatably mounted on the top of the base 61, is opposite the guiding element 62, and is driven by a power device. The pivot shaft 64 is securely mounted on a front side of the base 61.

The holder 65 is pivotally mounted around the pivot shaft 64 and has a mount 650, a first clamp 651, and a second clamp 652. The mount 650 is pivotally connected to the pivot shaft 64 and has a connecting end and a mounting end. The connecting end of the mount 650 is mounted around the pivot shaft 64. The mounting end of the mount 650 is formed with the connecting end of the mount 650 and extends outwardly from the front side of the base 61. The first clamp 651 is securely mounted on the mounting end of the mount 650, is used to hold an original key 71, and aligns with the guiding element 62. The second clamp 652 is securely mounted on the mounting end of the mount 650, is used to hold a duplicate key 72, and aligns with the cutting element 63.

In use, the holder 65 is rotated relative to the base 61 to enable a serration of the original key 71 to abut the guiding element 62 and to enable the cutting element 63 to cut and shape a corresponding serration on the duplicate key 72. Furthermore, the holder 65 is moved transversally relative to the pivot shaft 64 to enable the cutting element 63 to cut and shape corresponding serrations on the duplicate key 72 according to the serrations of the original key 71.

However, the holder 65 of the conventional key duplicating machine is directly and pivotally mounted around the pivot shaft 64, and the user may inadvertently touch the supporting handle 66 and make the holder 65 rotate relative to the base 61. Then, the cutting element 63 may cut and shape the duplicate key 72 without accurate accordance to a contour of the original key 71, and this may waste the material of the duplicate key and increase the cost of production. In addition, before the user is to make a duplicate of the original key 71, a distance between the keys 71, 72, the guiding element 62, and the cutting element 63 is too long and cannot provide any effective stroke to the conventional key duplicating machine. Then, the user needs more force to operate the conventional key duplicating machine.

To overcome the shortcomings, the present invention provides a stroke safety device for a key duplicating machine to mitigate or obviate the aforementioned problems.

SUMMARY OF THE INVENTION

The main objective of the present invention is to provide a stroke safety device for a key duplicating machine that can provide a secure operating effect to the users operating the key duplicating machine to make a duplicate of a key.

The stroke safety device for a key duplicating machine in accordance with the present invention has a fixed mount and a movable mount. The fixed mount is mounted around a connecting shaft of the key duplicating machine and has a first body, multiple first resilient members, multiple pressing elements, and an adjusting element. The first body has a through hole, an inclined segment, and a mounting recess. The movable mount is pivotally connected to the fixed mount and has a second body and an operating element. The second body is pivotally mounted on a base of the key duplicating machine to cover the inclined segment, and has two opposite side segments. The abutting rod is inserted into the mounting recess of the first body to selectively abut against the adjusting element.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
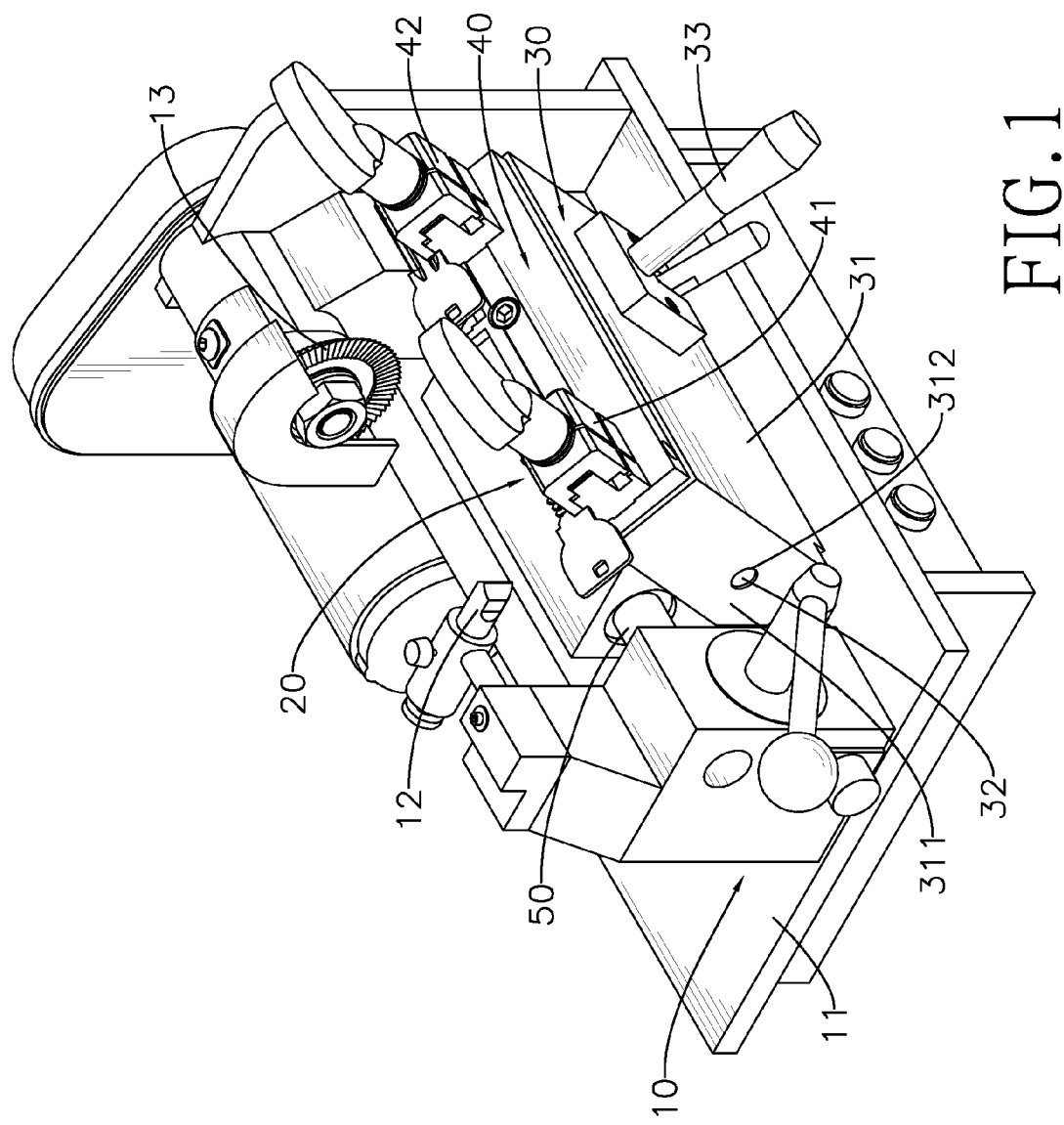
FIG. 1 is a perspective view of a stroke safety device for a key duplicating machine in accordance with the present invention.

With reference to FIG. 1, a stroke safety device for a key duplicating machine in accordance with the present invention is mounted on a key duplicating machine having a copy shaper apparatus 10, a holder 40, and a connecting shaft 50, and the stroke safety device comprises a fixed mount 20 and a movable mount 30.

The copy shaper apparatus 10 has a base 11, a guiding element 12, and a cutting element 13. The guiding element 12 is securely mounted on a top of the base 11 near a sidewall of the base 11. The cutting element 13 is securely mounted on the top of the base 11 and is opposite the guiding element 12. Furthermore, the copy shaper apparatus 10 is conventional and the features and the structures of the copy shaper apparatus 10 are not described in detail. The holder 40 is mounted above the base 11 of the copy shaper apparatus 10. The connecting shaft 50 is transversally mounted on the base 11 of the copy shaper apparatus 10 below the guiding element 12 and the cutting element 13.

Figure 2:
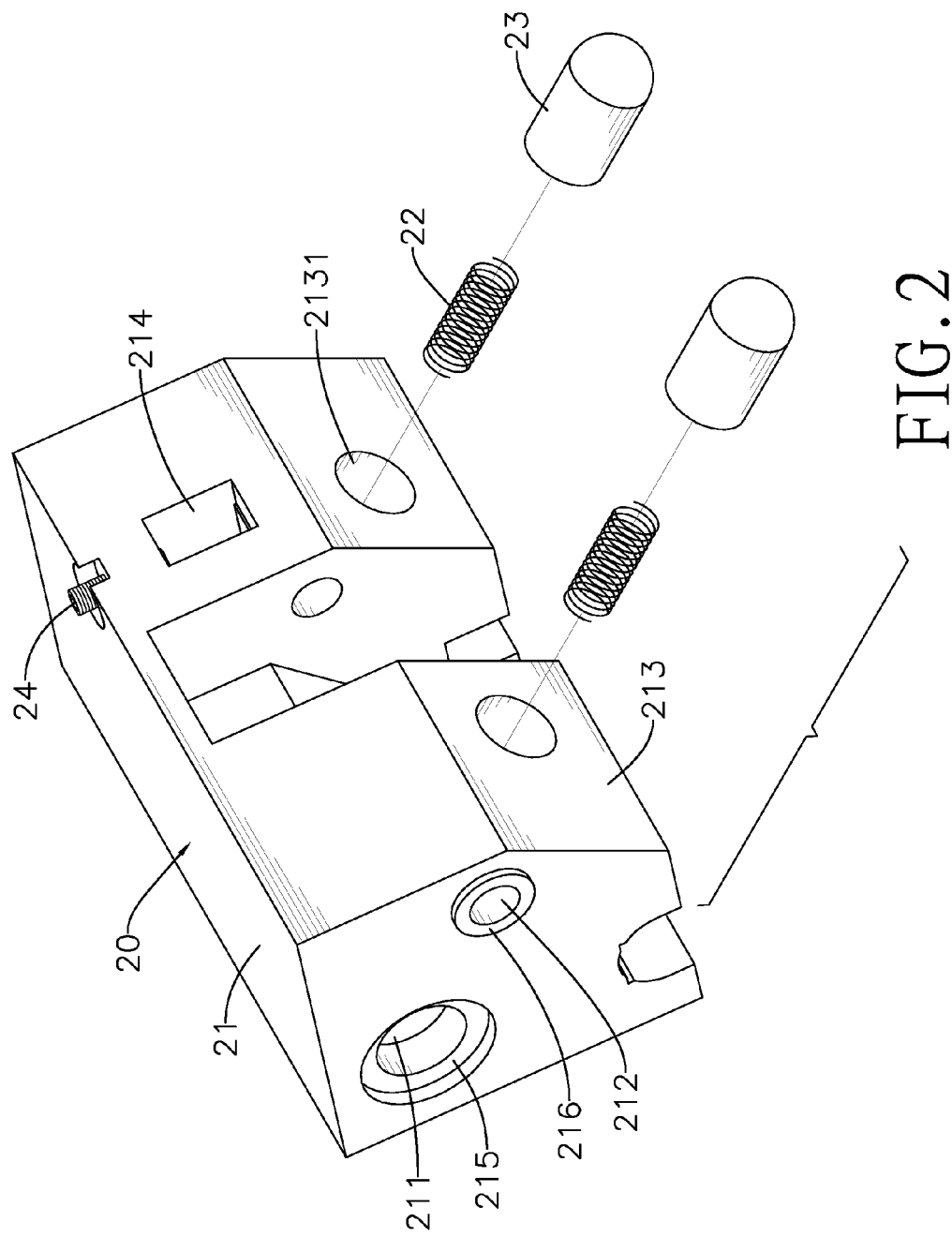
FIG. 2 is an enlarged exploded perspective view of a fixed mount of the stroke safety device in FIG. 1.

With reference to FIGS. 1 and 2, the fixed mount 20 is mounted around the connecting shaft 50 and has a first body 21, multiple first resilient members 22, multiple pressing elements 23, and an adjusting element 24.

The first body 21 is a block and has two opposite sidewalls, a front side, a bottom face, a top face, a through hole 211, a pivotal hole 212, an inclined segment 213, a mounting recess 214, a threaded hole, two first washers 215, and two second washers 216. The through hole 211 is formed through the opposite sidewalls of the first body 21 and is mounted around the connecting shaft 50. The pivotal hole 212 is formed through the opposite sidewalls of the first body 21. The inclined segment 213 is formed on the front side of the first body 21 near the bottom face of the first body 21 and has a front side and multiple holding recesses 2131. The holding recesses 2131 are formed in the front side of the inclined segment 213 at intervals. The mounting recess 214 is formed in the front side of the first body 21 near the inclined segment 213. The threaded hole is formed in the top face of the first body 21 and communicates with the mounting recess 214.

Figure 4:
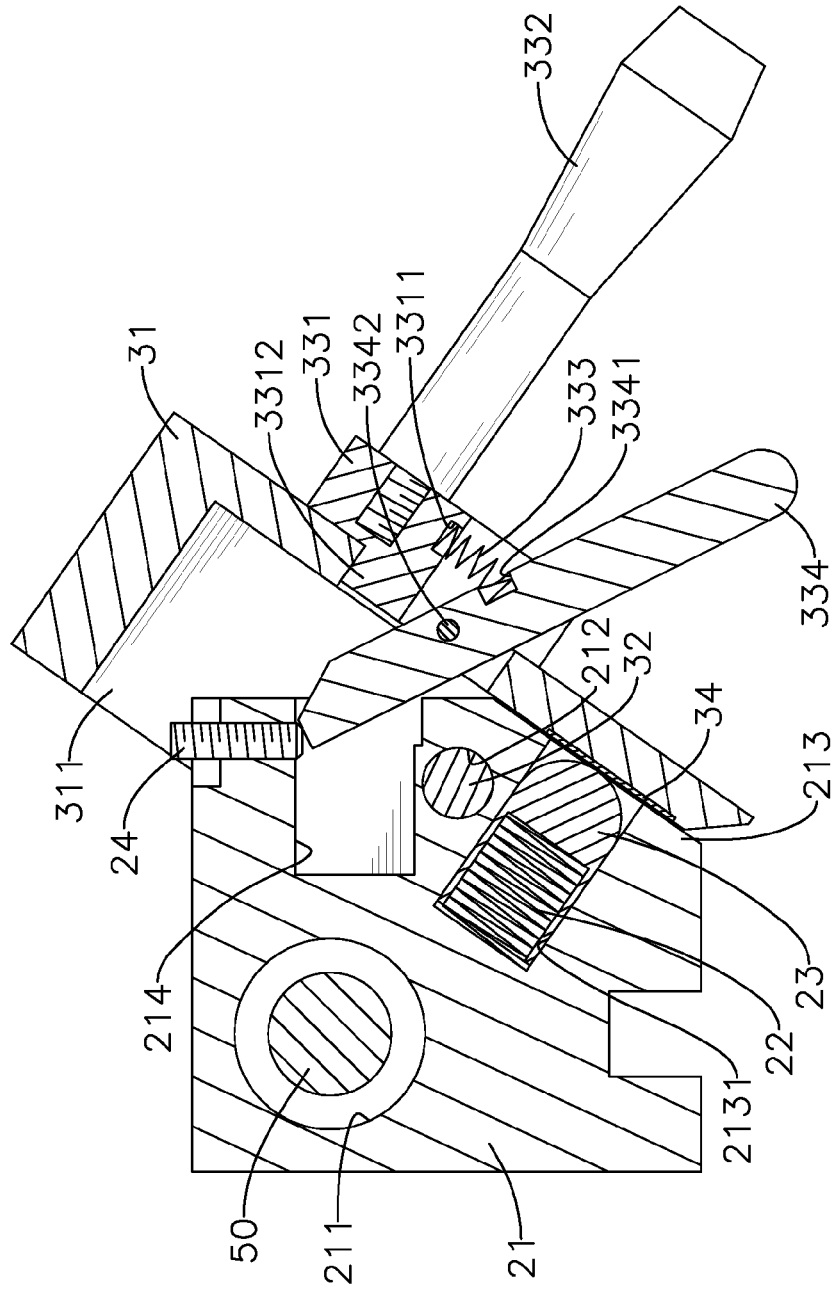
FIG. 4 is an enlarged cross-sectional side view of the stroke safety device in FIG. 1.

With reference to FIGS. 2 and 4, the first washers 215 are mounted in the through hole 211 respectively at two ends of the through hole 211. The second washers 216 are mounted in the pivotal hole 212 respectively at two ends of the pivotal hole 212. The connecting shaft 50 is mounted in the through hole 211 of the first body 21 and extends out of the first washers 215. Then, the fixed mount 20 can transversally move relative to the base 11 along the connecting shaft 50. The adjusting element 24 may be a screw, is mounted in the threaded hole of the first body 21, and has an inner end extending into the mounting recess 214 of the first body 21.

Preferably, the fixed mount 20 has two first resilient members 22 and two pressing elements 23, and the inclined segment 213 of the first body 21 has two holding recesses 2131. The two first resilient members 22 are respectively mounted in the two holding recesses 2131 of the inclined segment 213. The two pressing elements 23 are respectively mounted in the holding recesses 2131 of the inclined segment 213 to respectively abut the two first resilient members 22. In addition, each pressing element 23 may be a hemispherical hollow cylinder and each first resilient member 22 is a spring. Each first resilient member 22 has two ends respectively abutting an inner side of a corresponding holding recess 2131 and an inner side of a corresponding pressing element 23.

Figure 3:
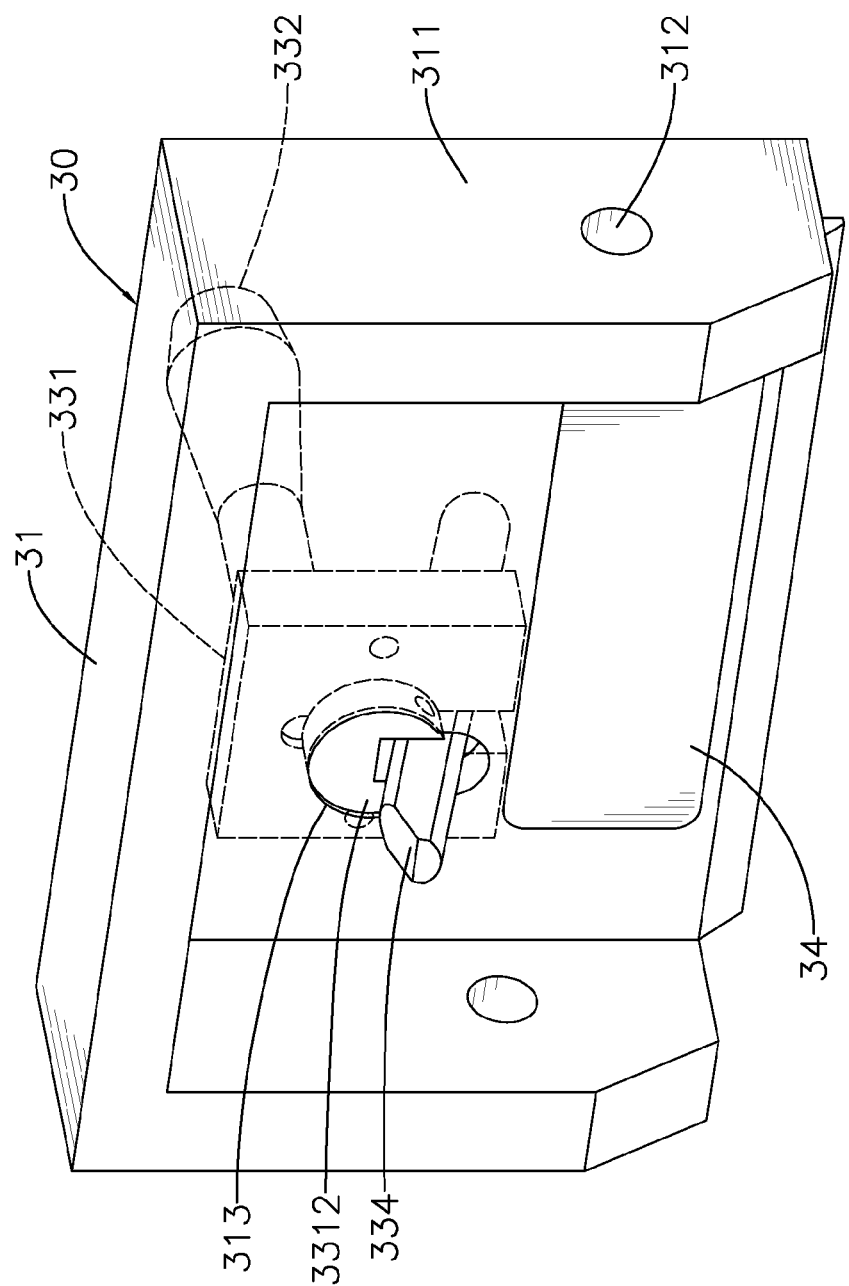
FIG. 3 is an enlarged perspective view of a movable mount of the stroke safety device in FIG. 1.

With reference to FIGS. 1 and 3, the movable mount 30 is pivotally connected to the fixed mount 20 and has a second body 31, a pivot shaft 32, an operating element 33, and a pressing panel 34.

The second body 31 is pivotally mounted on the base 11 of the copy shaper apparatus 10 to cover the inclined segment 213 of the first body 21, and the second body 31 has an open inner side, a closed outer side, two opposite side segments 311, two connecting holes 312, and a mounting hole 313. The open inner side of the second body 31 faces the first body 21 and is mounted around the inclined segment 213 of the first body 21. The opposite side segments 311 are formed on and protrude from the second body 31 beside the open inner side of the second body 31 and face to each other. The two connecting holes 312 are respectively formed through the two opposite side segments 311 and align with the pivotal hole 212 of the first body 21 of the fixed mount 20. The mounting hole 313 is formed through the closed outer side of the second body 31 and communicates with the open inner side of the second body 31.

The pivot shaft 32 is mounted in the pivotal hole 212 of the first body 21, extends out of the second washers 216, and is mounted in the connecting holes 312 of the second body 31. Then, the second body 31 is pivotally connected to the first body 21 by the pivot shaft 32. In addition, the pressing elements 23 are pressed against the second body 31 by the first resilient members 22.

With reference to FIGS. 3 and 4, the operating element 33 is connected to the second body 31 and has an assembling block 331, a handle 332, an abutting rod 334, and a second resilient member 333.

The assembling block 331 is mounted on the second body 31 and has an inner side, an outer side, a first assembling segment 3311, a protruding segment 3312, and a notch. The inner side of the assembling block 331 abuts the closed outer side of the second body 31. The first assembling segment 3311 is formed in the assembling block 331 between the inner side and the outer side of the assembling block 331. The protruding segment 3312 is formed on and protrudes from the inner side of the assembling block 331 and is mounted in the mounting hole 313 of the second body 31. The notch is formed through the assembling block 331 and the protruding segment 3312 and communicates with the first assembling segment 3311 and the mounting hole 313 of the second block 31. The handle 332 is connected to the outer side of the assembling block 331.

The abutting rod 334 is pivotally connected to the assembling block 331, is inserted into the mounting recess 214 of the first body 21 to selectively abut against the adjusting element 24, and has an inner end, an outer end, an external surface, a connecting pin 3342, and a second assembling segment 3341. The inner end of the abutting rod 334 extends out of the notch of the assembling block 331 and is inserted into the mounting recess 214 of the first body 21 to selectively abut against the adjusting element 24 via the mounting hole 313 of the second body 31. The outer end of the abutting rod 334 extends out of the outer side of the assembling block 331 via the notch and is mounted below the handle 332. The connecting pin 3342 is transversally mounted through the abutting rod 334 and is connected to the assembling block 331 to connect the abutting rod 334 pivotally to the assembling block 331. The second assembling segment 3341 is formed in the external surface of the abutting rod 334 and communicates with the notch of the assembling block 331.

The second resilient member 333 is mounted between the first assembling segment 3311 of the assembling block 331 and the second assembling segment 3341 of the abutting rod 334. When the inner end of the abutting rod 334 abuts against the adjusting element 24, the second body 31 abuts against the pressing elements 23 to compress the first resilient members 22 and to abut the inclined segment 213 of the first body 21. Preferably, the second resilient member 333 is a spring. The pressing panel 34 is mounted in the second body 31, faces the first body 21, and is pressed against by the pressing elements 23 of the fixed mount 20.

Furthermore, with reference to FIG. 1, the holder 40 is mounted on the movable mount 30 and has a first clamp 41 and a second clamp 42. The first clamp 41 is mounted on the second body 31, is used to hold an original key, and aligns with the guiding element 12. The second clamp 42 is mounted on the second body 31, is used to hold a duplicate key, and aligns with the cutting element 13. Additionally, the holder 40 is conventional and the features and structures of the holder 40 are not described in detail.

Figure 5:
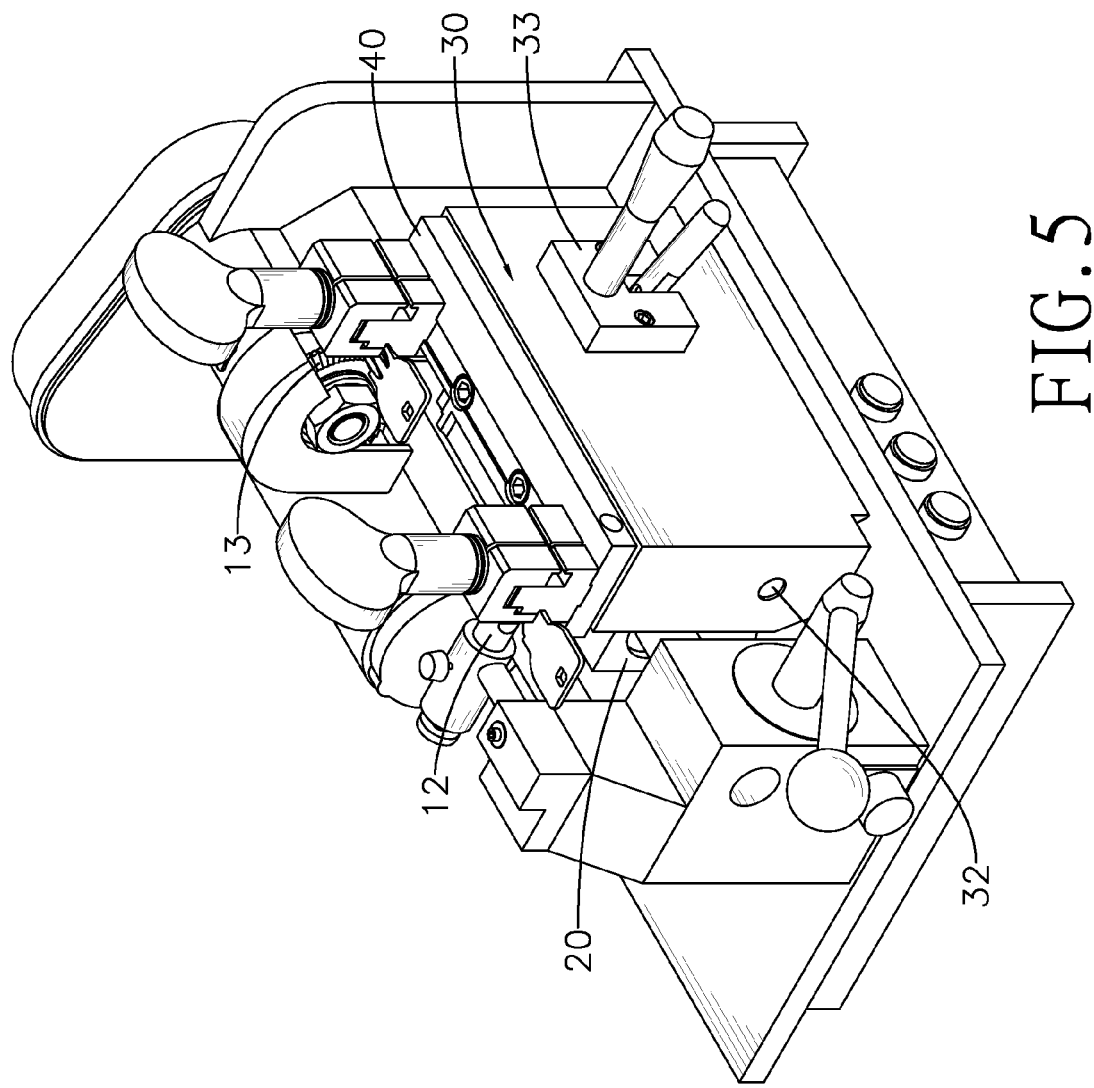
FIG. 5 is an operational perspective view of the stroke safety device in FIG. 1.
Figure 6:
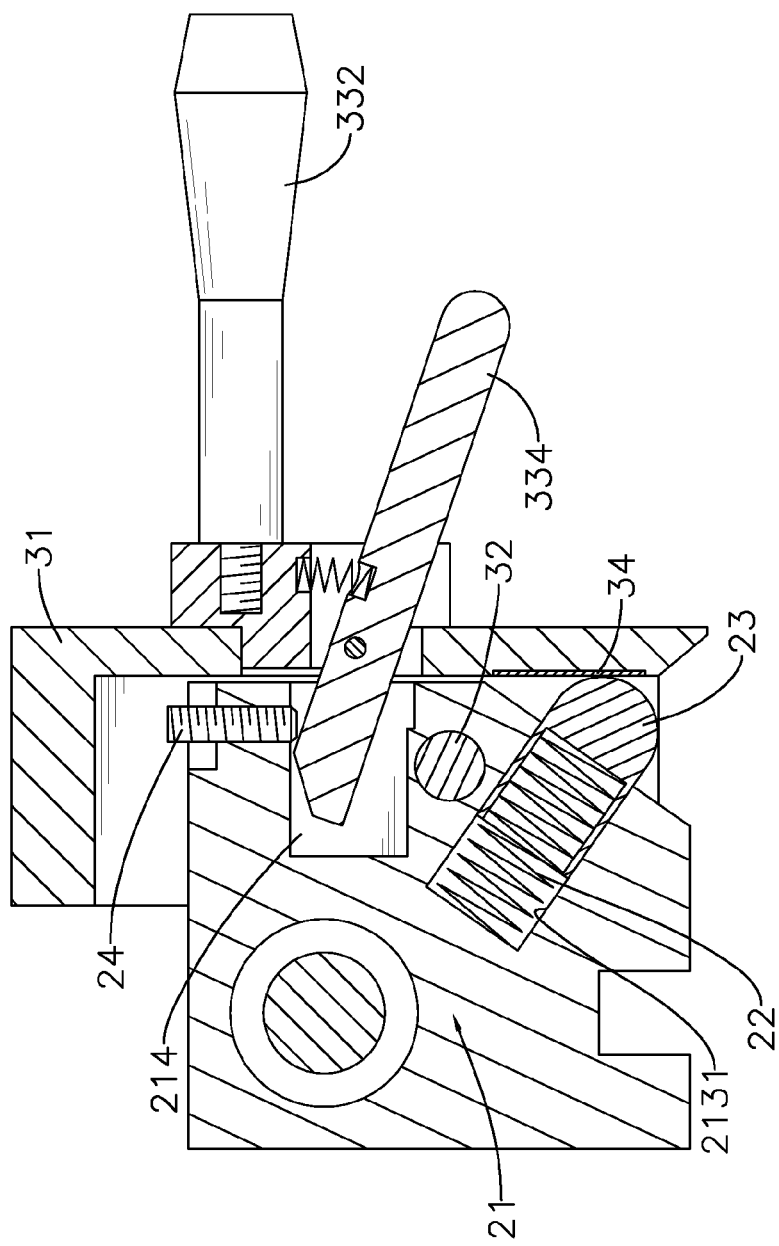
FIG. 6 is an enlarged cross-sectional side view of the stroke safety device in FIG. 5.
Figure 7:
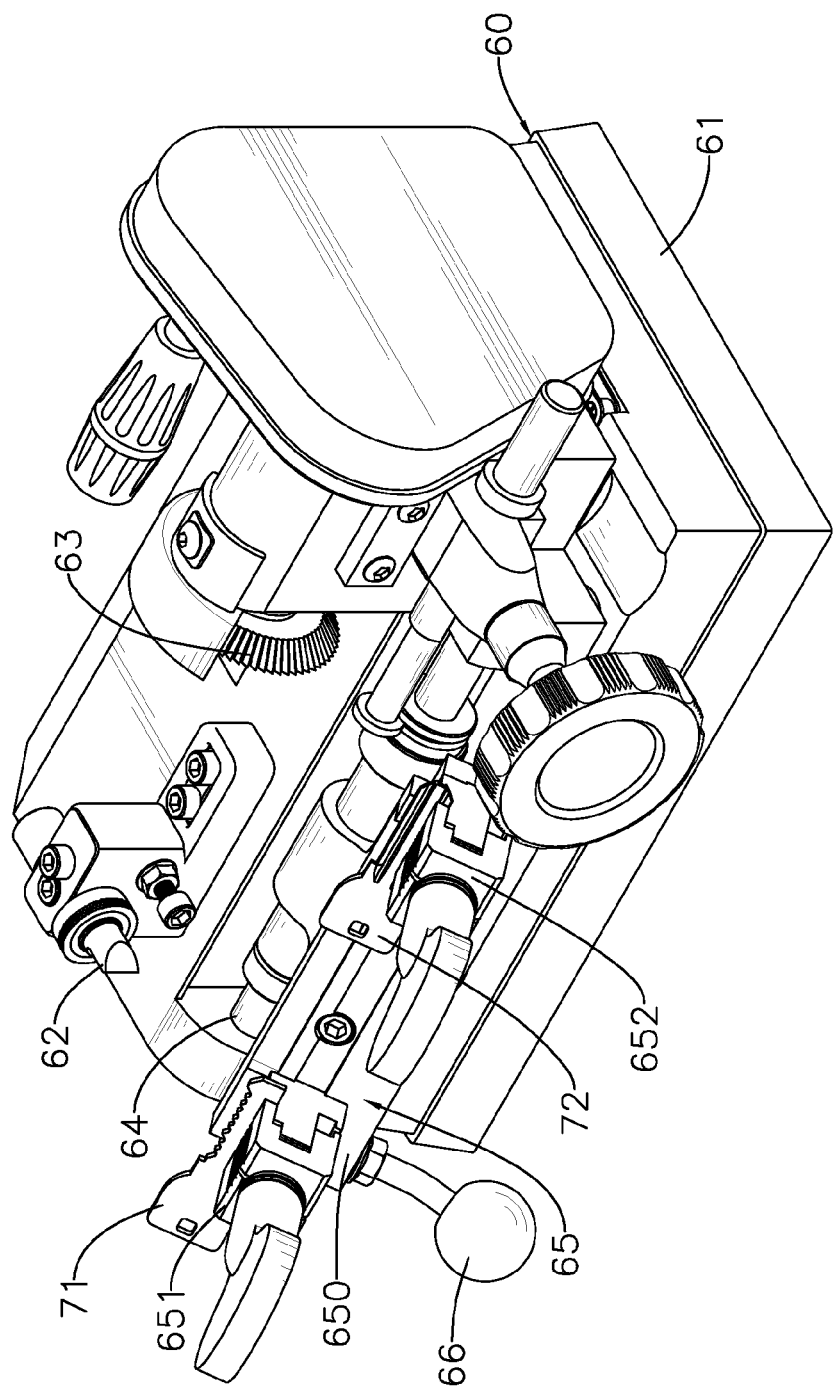
FIG. 7 is a perspective view of a key duplicating machine in accordance with the prior art.

In use, with reference to FIGS. 5 and 6, a user grips the handle 332 and presses the abutting rod 334 to enable the inner end of the abutting rod 334 to separate from and move across the adjusting element 24. Then, the pressing elements 23 is pressed by the first resilient members 22 to push the second body 31 to rotate forward to the first body 21 of the fixed mount 20. When the second body 31 rotates forward to the first body 21, the clamps 41, 42 of the holder 40 are rotated with the second body 31 and respectively align with the guiding element 12 and the cutting element 13 of the copy shaper apparatus 10. Consequently, the user can cut serrations on the duplicate key according to the serrations of the original key by the cutting element 13.

With further reference to FIG. 4, before the above-mentioned key-duplicating process, the abutting rod 334 of the operating element 33 is pressed against the adjusting element 24 of the fixed mount 20, and the user cannot rotate the movable mount 30 relative to the fixed mount 20 and this can prevent the cutting element 13 from cutting the duplicate key without accurate accordance to a contour of the original key when the movable mount 30 is inadvertently pushed.

In addition, when the abutting rod 334 is separated from the adjusting element 24, the first resilient members 22 can provide a pushing force to the second body 31 to rotate the movable mount 30 relative to the fixed mount 20 via the pressing elements 23, and this is effort-saving when the user makes a duplicate of the original key by the key duplicating machine. Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stroke safety device for a key duplicating machine having a copy shaper apparatus with a base, a holder mounted above the base of the copy shaper apparatus, and a connecting shaft transversally mounted on the base of the copy shaper apparatus, and the stroke safety device comprising:
   a fixed mount mounted around the connecting shaft and having
      a first body being a block and having
         two opposite sidewalls;
         a front side;
         a bottom face;
         a top face;
         a through hole formed through the opposite sidewalls of the first body and mounted around the connecting shaft;
         an inclined segment formed on the front side of the first body near the bottom face of the first body and having
            a front side; and
            multiple holding recesses formed in the front side of the inclined segment at intervals; and
         a mounting recess formed in the front side of the first body near the inclined segment;
      multiple first resilient members respectively mounted in the holding recesses of the inclined segment;
      multiple pressing elements respectively mounted in the holding recesses of the inclined segment to respectively abutting the resilient members; and
      an adjusting element mounted in the first body and having an inner end extending into the mounting recess of the first body; and
   a movable mount pivotally connected to the fixed mount and having
      a second body pivotally mounted on the base of the copy shaper apparatus to cover the inclined segment of the first body, the second body abutting against the pressing elements of the fixed mount and having
         an open inner side facing the first body and mounted around the inclined segment of the first body;
         a closed outer side; and
         two opposite side segments formed on and protruding from the second body beside the open inner side of the second body and facing to each other; and
      an operating element connected to the second body and having an abutting rod inserted into the mounting recess of the first body to selectively abut against the adjusting element.

2. The stroke safety device for a key duplicating machine as claimed in claim 1, wherein
   the second body has a mounting hole formed through the closed outer side of the second body and communicating with the open inner side of the second body;
   the operating element has
      an assembling block mounted on the second body and having
         an inner side abutting the closed outer side of the second body;
         an outer side;
         a first assembling segment formed in the assembling block between the inner side and the outer side of the assembling block;
         a protruding segment formed on and protruding from the inner side of the assembling block and mounted in the mounting hole of the second body; and
         a notch formed through the assembling block and the protruding segment and communicating with the first assembling segment and the mounting hole of the second block;
      a handle connected to the outer side of the assembling block; and
      a second resilient member;
   the abutting rod is pivotally connected to the assembling block, is inserted into the mounting recess of the first body to selectively abut against the adjusting element, and has
      an inner end extending out of the notch of the assembling block and inserted into the mounting recess of the first body to selectively abut against the adjusting element via the mounting hole of the second body;
      an outer end extending out of the outer side of the assembling block via the notch and mounted below the handle;
      an external surface;
      a connecting pin transversally mounted through the abutting rod and connected to the assembling block to connect the abutting rod pivotally to the assembling block; and
      a second assembling segment formed in the external surface of the abutting rod and communicating with the notch of the assembling block; and wherein the second resilient member is mounted between the first assembling segment of the assembling block and the second assembling segment of the abutting rod.

3. The stroke safety device for a key duplicating machine as claimed in claim 2, wherein
the fixed mount has
a pivotal hole formed through the opposite sidewalls of the first body;
two first washers mounted in the through hole respectively at two ends of the through hole; and
two second washers mounted in the pivotal hole respectively at two ends of the pivotal hole;
the second body has two connecting holes respectively formed through the two opposite side segments and aligning with the pivotal hole of the first body of the fixed mount; and
the movable mount has
a pivot shaft mounted in the pivotal hole of the first body, extending out of the second washers, and mounted in the connecting holes of the second body; and
a pressing panel mounted in the second body, facing the first body, and pressed against by the pressing elements of the fixed mount.

4. The stroke safety device for a key duplicating machine as claimed in claim 1, wherein
the first body has a threaded hole formed in the top face of the first body and communicating with the mounting recess; and
the adjusting element is a screw and is mounted in the threaded hole of the first body.

5. The stroke safety device for a key duplicating machine as claimed in claim 2, wherein
the first body has a threaded hole formed in the top face of the first body and communicating with the mounting recess; and
the adjusting element is a screw and is mounted in the threaded hole of the first body.

6. The stroke safety device for a key duplicating machine as claimed in claim 3, wherein
the first body has a threaded hole formed in the top face of the first body and communicating with the mounting recess; and
the adjusting element is a screw and is mounted in the threaded hole of the first body.

7. The stroke safety device for a key duplicating machine as claimed in claim 1, wherein
the inclined segment of the first body has two holding recesses;
the fixed mount has
two first resilient members respectively mounted in the two holding recesses of the inclined segment; and
two pressing elements respectively mounted in the holding recesses of the inclined segment to respectively abutting the two resilient members;
each pressing element is a hemi-spherical hollow cylinder; and
each first resilient member is a spring and has two ends respectively abutting an inner side of a corresponding holding recess and an inner side of a corresponding pressing element.

8. The stroke safety device for a key duplicating machine as claimed in claim 2, wherein
the inclined segment of the first body has two holding recesses;
the fixed mount has
two first resilient members respectively mounted in the two holding recesses of the inclined segment; and
two pressing elements respectively mounted in the holding recesses of the inclined segment to respectively abutting the two resilient members;
each pressing element is a hemi-spherical hollow cylinder; and
each first resilient member is a spring and has two ends respectively abutting an inner side of a corresponding holding recess and an inner side of a corresponding pressing element.

9. The stroke safety device for a key duplicating machine as claimed in claim 3, wherein
the inclined segment of the first body has two holding recesses;
the fixed mount has
two first resilient members respectively mounted in the two holding recesses of the inclined segment; and
two pressing elements respectively mounted in the holding recesses of the inclined segment to respectively abutting the two resilient members;
each pressing element is a hemi-spherical hollow cylinder; and
each first resilient member is a spring and has two ends respectively abutting an inner side of a corresponding holding recess and an inner side of a corresponding pressing element.

10. The stroke safety device for a key duplicating machine as claimed in claim 7, wherein
the first body has a threaded hole formed in the top face of the first body and communicating with the mounting recess; and
the adjusting element is a screw and is mounted in the threaded hole of the first body.

11. The stroke safety device for a key duplicating machine as claimed in claim 8, wherein
the first body has a threaded hole formed in the top face of the first body and communicating with the mounting recess; and
the adjusting element is a screw and is mounted in the threaded hole of the first body.

12. The stroke safety device for a key duplicating machine as claimed in claim 9, wherein
the first body has a threaded hole formed in the top face of the first body and communicating with the mounting recess; and
the adjusting element is a screw and is mounted in the threaded hole of the first body.

* * * * *